No. 881,028. PATENTED MAR. 3, 1908.
A. S. F. ROBINSON.
CLUTCH.
APPLICATION FILED OCT. 4, 1907.

3 SHEETS—SHEET 1.

Witnesses:
W. Henry Simms
E. Blough

Inventor
A. S. F. Robinson
per W. Lloyd Wise
Attorney

No. 881,028. PATENTED MAR. 3, 1908.
A. S. F. ROBINSON.
CLUTCH.
APPLICATION FILED OCT. 4, 1907.

3 SHEETS—SHEET 2.

Witnesses:
W. Henry Simms
E. Clough

Inventor
A. S. F. Robinson
W. Lloyd Wise
Attorney

THE NORRIS PETERS CO., WASHINGTON, D. C.

No. 881,028. PATENTED MAR. 3, 1908.
A. S. F. ROBINSON.
CLUTCH.
APPLICATION FILED OCT. 4, 1907.

3 SHEETS—SHEET 3.

Witnesses
Inventor:
A. S. F. Robinson
Attorney

UNITED STATES PATENT OFFICE.

ARTHUR SAMUEL FRANCIS ROBINSON, OF BECCLES, ENGLAND.

CLUTCH.

No. 881,028.  Specification of Letters Patent.  Patented March 3, 1908.

Application filed October 4, 1907. Serial No. 395,934.

*To all whom it may concern:*

Be it known that I, ARTHUR SAMUEL FRANCIS ROBINSON, a subject of the King of Great Britain and Ireland, residing at Beccles, in the county of Suffolk, England, have invented Improvements in Clutches, of which the following is a specification.

This invention relates to friction clutches of the coil type in which the coiled band is a flexible rope, for example a hemp, steel wire rope or the like.

According to this invention the coil is connected at both ends to one of the two parts of the clutch and is adapted to be caused to grip the other clutch part by suitably pulling on one end or both ends or an intermediate part of the coil.

In order to effect the desired pull on the coil one end portion, or an intermediate part thereof, may be connected to a member mounted to slide on that portion of the clutch to which the coil ends are secured.

For the purpose of increasing the pressure or grip several coils may be employed according to this invention, and to equalize the pull of the several coils they may be connected to the opposite ends of compensating levers carried by a sliding member the movement of which actuates the clutch.

To prevent the clutch being thrown into action too suddenly the operating member may be connected to a retarding device such as a dash pot or the like device.

Figure 1:
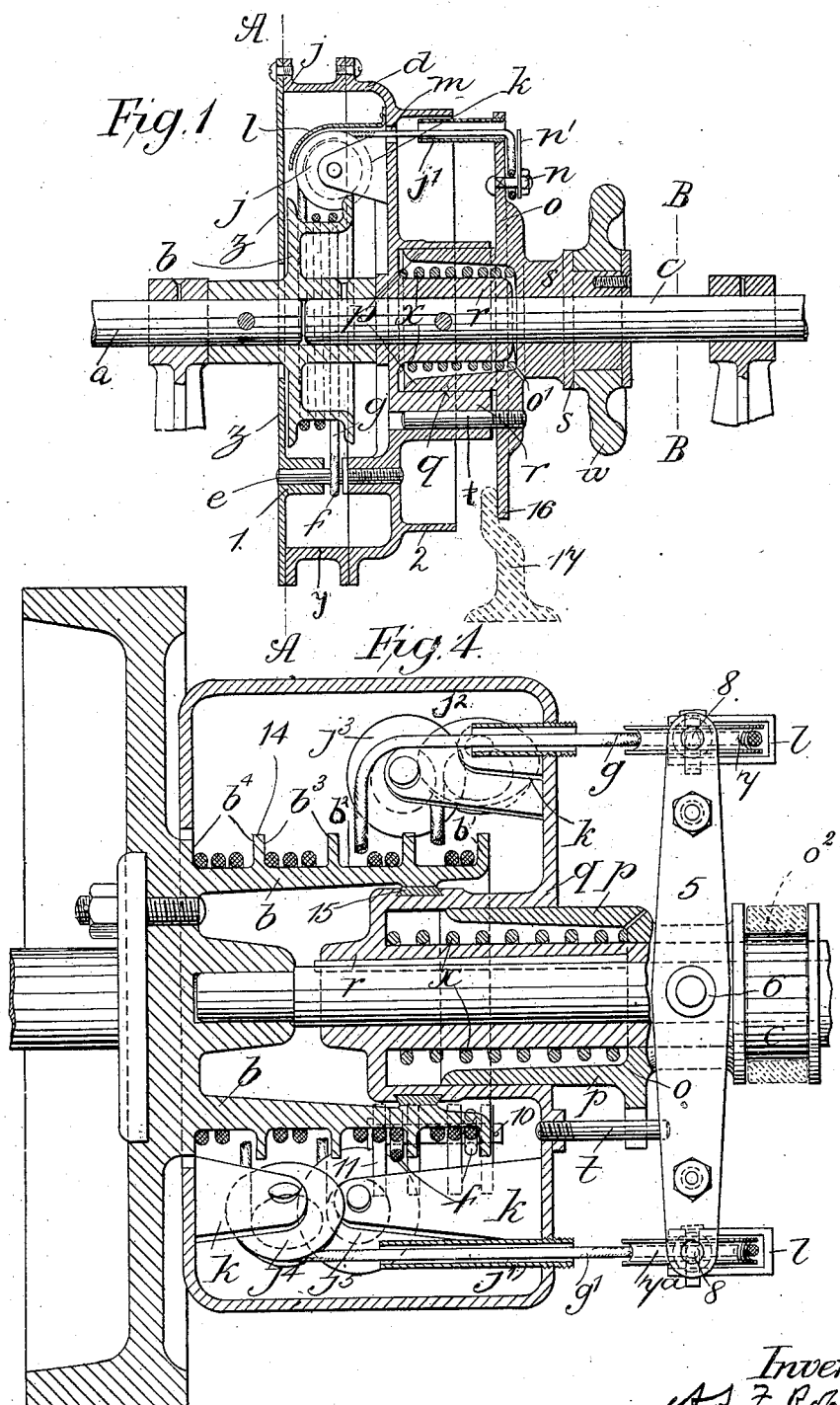
Figure 2:
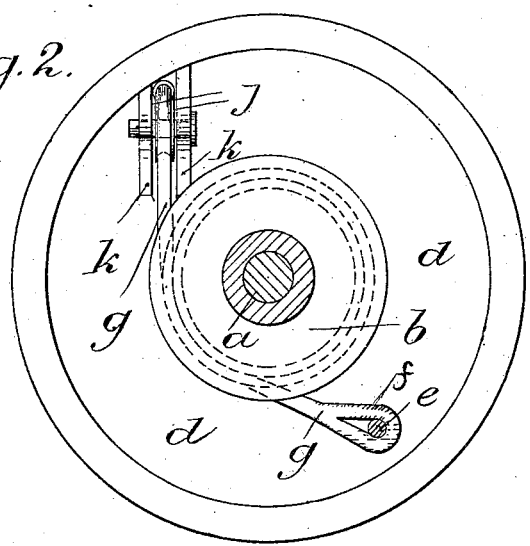
Figure 5:
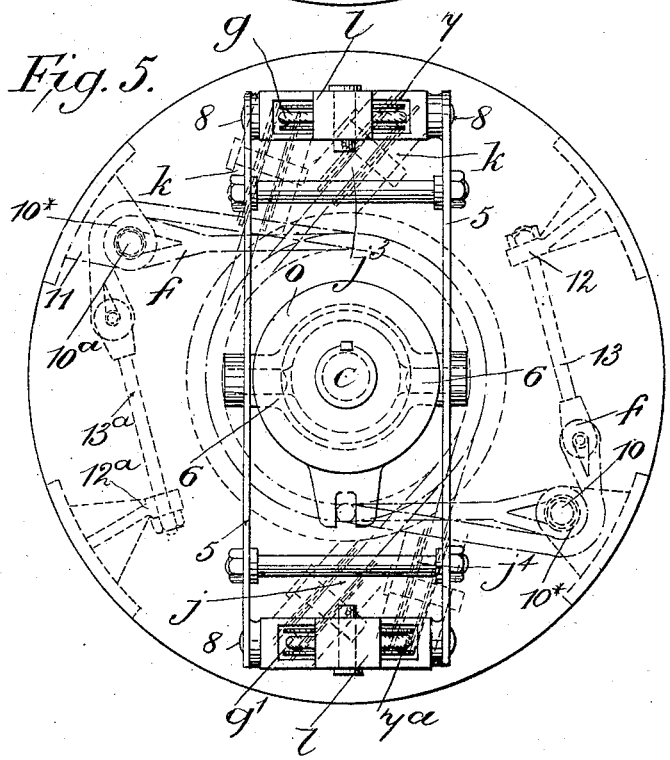
Figure 3:
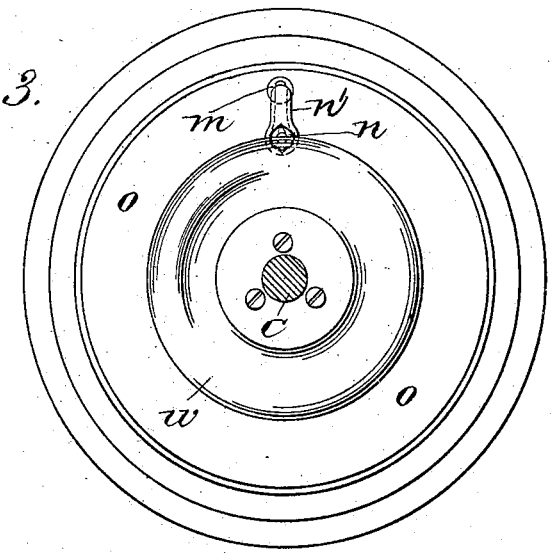
Figure 6:
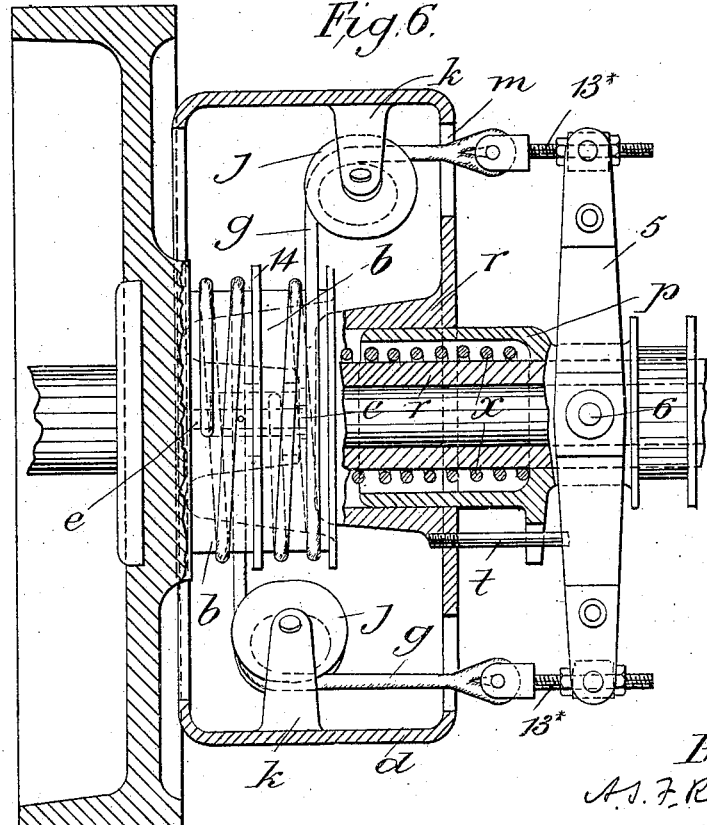

Figure 1 of the accompanying illustrative drawings shows in central vertical longitudinal section one construction of clutch embodying this invention. Figs. 2 and 3 are transverse vertical sections corresponding to the lines A, A and B, B, respectively of Fig. 1. Fig. 4 is a similar view to Fig. 1, and Fig. 5 is an end view, showing another construction of the improved clutch. Fig. 6 shows partly in central vertical section and partly inside elevation a modification in which two flexible ropes are employed.

In the construction shown in Figs. 1, 2 and 3 the shaft $a$, which may be the driving or the driven shaft, has fixed to it a double flanged drum $b$ of suitable diameter for the necessary peripheral speed. Juxtaposed to the end of the shaft $a$ is the end of a shaft $c$, which is arranged coaxially therewith and on which is mounted a disk or drum $d$ (hereinafter called a disk) having at a point near its periphery a stud $e$ to which the eye $f$ of a rope $g$ is fixed. An oppositely placed guide pulley $j$ mounted in jaws $k$ attached to the disk $d$ guides the rope $g$, after it has been coiled one or more times around the drum $b$, so that its other end can be passed through a hole $m$ in the disk $d$ and through a guide tube $j^1$ fixed to a sliding sleeve or disk $o$ (hereinafter called a sleeve), the end of the rope being attached thereto by a clamping nut $n$ and washer plate $n^1$.

The sleeve $o$ is connected to the disk $d$ by a sliding pin $t$ and is carried partly by a cylindrical boss $p$ arranged within an annular recess $q$ in the boss $r$ of the disk $d$ and partly by an outwardly extending portion or boss $s$ sliding on the shaft $c$. The arrangement is such that the rope $g$ on the drum $b$ can be rendered sufficiently slack for the drum to revolve freely within it by sliding the sleeve $o$ inwardly, but, on moving the sliding sleeve $o$ outwardly, the rope $g$ is tightened and a powerful grip drive is immediately transmitted (but with sufficient slip as the coil tightens to prevent shock) through the drum $b$ to the fixed end $f$ of the rope on the disk $d$. Slight inward adjustment of the sleeve $o$ immediately releases this grip, to insure which the rope $g$ is prevented from slackening except at the drum $b$ by the tube $j^1$ and a shield $l$ fixed to the disk $d$ as shown.

As shown a hand operating wheel $w$ may be mounted to freely rotate but not move endwise on the boss $s$ of the sliding sleeve.

The cylindrical boss $p$ of the sliding sleeve $o$ fits the annular recess $q$ in the boss $r$ of the disk $d$ so that the rate at which air can be drawn into the dash pot so formed regulates the rate at which the sliding sleeve $o$ can be drawn outwardly to throw in the clutch. A spring $x$ may be located within the dash pot $q$, as shown, the spring being adapted to press the sliding sleeve $o$ outwardly and tighten the coil of the rope $g$ around the drum $b$, the coil being slackened by pressing inwardly the sleeve $o$ against the action of the spring $x$ by hand, as in the example illustrated, or by foot gear. Generally there is sufficient leakage between the sliding parts of the dash pot but there may be a small air hole $o^1$ in the sleeve $o$ if required.

The drum $b$ and the coil thereon may be located in a casing $y$ secured to the disk or drum $d$. The end $z$ of the casing $y$ may be made removable, as shown, and be formed with an inwardly extending boss $l$ into which the stud $e$ of the disk $d$ extends.

2 is an annular guard shown formed in one with the disk $d$.

Fig. 4 is a similar view to Fig. 1, and Fig. 5 is an end view showing another construction in which the drum $b$ is embraced by four coils, the pulling points being thereby increased in number so that only one fourth of the total load is transmitted by the operative or pulling end of each rope coil and the friction between the coils and the drums or drum sections is equally distributed and the tendency of the drum to heat locally thus reduced when constant or frequent slipping is necessary as in motor omnibus or other clutches designed for use in traffic. With such an arrangement the effect of the rope $g$ on the drum $b$ is increased and the pressure or grip on each portion of the drum $b$ is equalized and a comparatively small rope may be employed in a clutch adapted to transmit a comparatively heavy load. In this construction a compensating lever 5 is fulcrumed to bosses 6 on the sliding sleeve $o$ and this lever has at one end a pulley 7 and at its other end a pulley $7^a$ round which ropes $g$, $g^1$ are passed. Each pulley is mounted in a jaw with rope shields $l$ and trunnions which may swivel at 8 in the ends of the lever 5. Each end of these ropes is passed over guide pulleys carried in jaws $k$ of the disk $d$ and thence around two adjoining portions or sections of the drum $b$ to points at which the ends $f$ are fixed to the disk $d$ by pins 10, $10^a$ which are carried by lugs 11. Either or both of the ends $f$ of such rope may be rendered adjustable by an eye 12 and bolt 13 or the like, as indicated by the dotted lines in Fig. 5, but if one rope should be relatively slightly longer or shorter than the other the compensating lever 5 would immediately adjust itself so that each separate coil of the rope would grip equally owing to the compensating action of the pulleys 7, $7^a$.

The drum $b$ is divided by flanges 14 into four drum sections, one for each end of each rope. The rope $g$ extends from the pin 10 to drum section $b^1$ around which it is coiled, over the guide pulley $j^2$, around the pulley 7 of the compensating lever 5, over the guide pulley $j^3$, coiled around the adjacent drum section $b^2$ in the same direction as on the section $b^1$ and secured at its other end to the pin 10, or as indicated in dotted lines, is passed over a roller $10^*$ and secured to an adjustable bolt 13 which is passed through an eye 12. In like manner one end of the rope $g^1$ is connected to the pin $10^a$, which is located diametrically opposite the pin 10, and coiled around the drum section $b^4$ in the same direction as the coil on the other drum sections $b^1$ and $b^2$ and, after passing over the guide pulley $j^4$, around the other pulley $7^a$ of the compensating lever 5, and the guide pulley $j^5$, the rope is coiled around the drum section $b^3$ in the same direction, and secured to the pin $10^a$, or as indicated in dotted lines, is passed over a roller $10^*$ and secured to an adjustable bolt $13^a$ which is passed through an eye $12^a$.

At its inner end the drum $b$ is steadied by bearing on a ring 15 of antifriction metal fixed on the exterior of the boss $r$ of the disk $d$.

The boss of the sleeve $o$ beyond the compensating lever 5 is grooved to receive a loose collar $o^2$ adapted to be connected to a foot lever or other actuating device.

The compensating lever 5 may be held in its mid-position when the coil is slackened as by light springs.

It will be understood that in the clutch shown in Figs. 4 and 5, each end of the ropes $g$ and $g^1$ is arranged to pull upon the disk $d$ so that four pulling points are provided.

Fig. 6 which is a similar view to Fig. 1 illustrates a modification in which two ropes $g$ and $g^1$ are employed, one end of each rope being connected to a bolt $13^*$ adjustably mounted in the end of the compensating lever 5; the other ends of the ropes are secured to studs $e$ fixed to the disk $d$.

As will be understood in friction clutches constructed as described the driving and driven parts can be put into and out of driving connection by moving the end or part of the rope connected to the sliding sleeve whether the driving part of the clutch be in motion or not.

In clutches comprising several coils the turns each coil makes around the drum may be comparatively few, say one and a half to two turns, so that but slight movement of the sliding member is necessary to cause the coils to tighten or slacken on the drum.

In cases where the clutch-operating mechanism comprises a sliding member $o$ mounted on the part to be driven and to rotate therewith, a spring pressed arm or other suitable braking arrangement may be so arranged in the path of the sliding member that when such member is moved in a direction to put the clutch out of action, that is to say to slacken the coil or coils, the arm will bear upon the sliding member so as to frictionally retard its rotation. Such an arrangement is indicated by dotted lines in Fig. 1, referring to which, 16 is a flange or rim on the sleeve $o$ and 17 an arm or brake shoe located in the path of the flange or rim 16 in such position that when the coil is slackened the arm or shoe 17 is in contact with the flange or rim 16.

The rope employed may conveniently be what is known as sash cord or plaited hollow rope, which may or may not have a flexible steel wire threaded through it.

Ordinary rope or hemp-covered wire rope or a dry band of leather may be employed as no lubricant is necessary, except in so far as conditioning the rope, and the friction is always practically the same; thus the continuous use of antifriction lubricant where a frictional grip is to be obtained is obviated. Ordinary flexible steel rope may however be used when lubricant is employed.

It will be understood that clutches according to this invention may serve to drive in both directions, but when the direction of rotation is such that the pulled end or part of the rope becomes the driving end, the drive is proportional to the force with which the spring $x$ presses out the sliding clutch actuating member $o$. This is also the case when both ends of the rope $g$ are attached to the sliding sleeve $o$.

What I claim is:—

1. In a friction clutch, a rotary driving part, a rotary driven part, a flexible rope carried by one said clutch part and comprising a coil that embraces and is adapted to grip the other said part, an actuating member mounted to rotate with said rope-carrying part, a lever to which a part of said rope is connected pivoted to said actuating member, and means for moving said actuating member relatively to the coil portion of said rope in a longitudinal direction.

2. In a friction clutch, a rotary driving part, a rotary driven part, a flexible rope carried by one said clutch part and comprising a coil that embraces and is adapted to grip the other said part, an actuating member mounted to rotate with said rope-carrying part, a lever to which a part of said rope is connected pivoted to said actuating member, a spring for moving said actuating member relatively to the coil portion of said rope, and means for moving said actuating member against the action of said spring.

3. In a friction clutch, a rotary driving part, a rotary driven part, a number of flexible ropes carried by one said clutch part and each comprising two coils that embrace and are adapted to grip the other said part, means for securing the end portions of said ropes to said rope-carrying part, an actuating member, to which portions of said ropes intermediate of their coils are connected, mounted to rotate with said rope carrying part, and means for moving said actuating member relatively to the coils of said ropes.

4. In a friction clutch, a rotary driving part, a rotary driven part, a number of flexible ropes carried by one said clutch part and each comprising two coils that embrace and are adapted to grip the other said part, means for securing the end portions of said ropes to said rope carrying part, an actuating member mounted to rotate with said rope carrying part, a lever pivoted to said actuating member, parts on said lever over which pass portions of said ropes intermediate of their coils, and means for moving said actuating member relatively to the coils of said ropes.

5. In a friction clutch, a rotary driving part, a rotary driven part, a number of flexible ropes carried by one said clutch part and each comprising two coils that embrace and are adapted to grip the other said part, means for securing the end portions of said ropes to said rope carrying part, an actuating member mounted to rotate with said rope carrying part, a lever pivoted to said actuating member, pulleys on said lever over which pass portions of said ropes intermediate of their coils, and means for moving said actuating member relatively to the coils of said ropes.

6. In a friction clutch, a rotary driving part, a rotary driven part, a flexible coil embracing and adapted to grip one said clutch part, a clutch actuating member mounted to rotate with the said coil-carrying part and to which a part of the said coil is connected, means for moving said actuating member relatively to said coil in an axial direction, and means for retarding the operative movement of said actuating member.

7. In a friction clutch, a rotary driving part, a rotary driven part, a flexible coil embracing and adapted to grip one said clutch part, a clutch actuating member mounted to rotate with the said coil-carrying part and to which a part of the said coil is connected, means for moving said actuating member relatively to said coil in an axial direction, and a dash pot device adapted to retard movement of said actuating member in a direction to cause said flexible coil to grip.

8. In a friction clutch, a rotary driving part, a rotary driven part, a flexible rope carried by one said clutch part comprising a coil that embraces and is adapted to grip the other said part, an actuating member, to which a part of said rope is connected, mounted to rotate with said rope carrying part, guide pulleys over which said rope is lead mounted on said rope carrying part, and means for moving said actuating member relatively to the coil portion of said rope in a longitudinal direction.

9. In a friction clutch, a rotary drum, a rotary carrier surrounding said drum, a part mounted to slide on but rotate with said carrier, a lever pivoted to said sliding part, guide pulleys on said carrier, oppositely arranged rope pulleys on said lever, ropes each fixed at both ends to said carrier coiled around said drum, led over said guide pulleys and over one of said lever pulleys intermediate between its coiled portions, and means for moving said sliding part relatively to the coiled portions of said rope.

10. In a friction clutch, a rotary drum, a rotary carrier surrounding said drum, a part mounted to slide on but rotate with said carrier, a lever pivoted to said sliding part, guide pulleys on said carrier, guide tubes on said carrier, oppositely arranged rope pulleys on said lever, ropes each fixed at both ends to said carrier coiled around said drum, led over said guide pulleys, through said guide tubes and over one of said lever pulleys intermediate between its coiled portions, and means for moving said sliding part relatively to the coiled portions of said rope.

11. In a friction clutch, a rotary drum, a rotary carrier surrounding said drum, a part mounted to slide on but rotate with said carrier, a lever pivoted to said sliding part, guide pulleys on said carrier, a spring between said carrier and said sliding part, oppositely arranged rope pulleys on said lever, ropes each fixed at both ends to said carrier coiled around said drum, led over said guide pulleys and over one of said lever pulleys intermediate between its coiled portions, and means for moving said sliding part relatively to the coiled portions of said rope.

12. In a friction clutch, a rotary rope drum, a rotary carrier surrounding said drum and formed with a hollow boss, a part mounted to slide on but rotate with said carrier, a piston-like part on said sliding part adapted to work within the hollow boss of said carrier, a spring within the hollow boss of said carrier bearing against said piston, a lever pivoted to said sliding part, guide pulleys on said carrier, oppositely arranged rope pulleys on said lever, ropes each fixed at both ends to said carrier coiled around said drum, led over said guide pulleys and over one of said lever pulleys intermediate between its coiled portions, and means for moving said sliding part against the action of said spring.

13. In a friction clutch, a rotary driving part, a rotary driven part, a flexible rope comprising a coil that embraces one member and passing over pulleys carried by the other member and secured to the last named member.

14. In a friction clutch, a rotary driving part, a rotary driven part, flexible cables wound upon one member and passing over pulleys carried by the other member and having their free ends secured thereto.

15. In a friction clutch, a rotary driving part, a rotary driven part, flexible cables wound upon one member and passing over pulleys carried by the other member and attached thereto, and an equalizing means for equalizing the tension upon said member.

16. In a friction clutch, a rotary driving part, a rotary driven part, a flexible cable wound upon one member and passing over a pulley carried by the other member, and having its end secured thereto, and means for governing the tightening of said cable.

17. In a friction clutch, a rotary driving part, a rotary driven part, longitudinally slidable thereon, a flexible cable wound upon one member and passing over a pulley carried by the other member and having its end secured thereto, a dash pot connection between said members whereby the longitudinal movement of the said member is limited.

18. In a friction clutch, a rotary driving part, a flexible rope comprising a coil wound upon one member and slidably passing over a portion of the other member, and secured thereto, and an equalizing means for equalizing the tension of the flexible rope.

19. In a friction clutch, a rotary driving part, a rotary driven part, longitudinally-slidable thereon, a flexible cable wound upon one member and passing over a portion of the other member and having its end secured thereto, a dash-pot connection between said members whereby the longitudinal movement of the said member is limited.

Signed at Lowestoft in the county of Suffolk in England this twenty third day of September 1907.

ARTHUR SAMUEL FRANCIS ROBINSON.

Witnesses:
T. M. ALLERTON,
WM. K. SANDERS.